United States Patent
Wang et al.

(10) Patent No.: US 9,444,196 B2
(45) Date of Patent: Sep. 13, 2016

(54) ELECTRICAL CONNECTOR

(71) Applicant: Molex, LLC, Lisle, IL (US)

(72) Inventors: Hong-Liang Wang, Chengdu (CN); Shang-Xiu Zeng, Chengdu (CN); Kian-Heng Lim, Singapore (SG)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/812,342

(22) Filed: Jul. 29, 2015

(65) Prior Publication Data

US 2016/0036172 A1    Feb. 4, 2016

(30) Foreign Application Priority Data

Jul. 29, 2014    (CN) .......................... 2014 1 0364710

(51) Int. Cl.
| H01R 13/70 | (2006.01) |
|---|---|
| H01R 12/70 | (2011.01) |
| H01R 13/703 | (2006.01) |
| G06K 19/00 | (2006.01) |
| G06K 7/00 | (2006.01) |

(52) U.S. Cl.
CPC ......... H01R 13/7033 (2013.01); G06K 7/0021 (2013.01); G06K 19/00 (2013.01)

(58) Field of Classification Search
CPC .... H01R 13/641; H01R 12/70; H01R 13/70; H01R 12/71
USPC ............................. 439/488, 489, 620.21, 188
See application file for complete search history.

(56) References Cited

U.S. PATENT DOCUMENTS

| 6,113,440 | A | 9/2000 | Fijten |
| 6,454,607 | B2 | 9/2002 | Bricaud |
| 6,843,688 | B2 | 1/2005 | Matsunaga et al. |
| 7,775,826 | B1 | 8/2010 | Wang |
| 7,798,859 | B1 | 9/2010 | Yang |
| 8,564,965 | B2 | 10/2013 | Sloey et al. |
| 2009/0023319 | A1* | 1/2009 | Hou . ................. H01R 13/2442 439/159 |
| 2010/0055985 | A1* | 3/2010 | Hu ..................... H01R 13/2442 439/626 |
| 2011/0269328 | A1 | 11/2011 | Huo |
| 2013/0005166 | A1* | 1/2013 | Lim ...................... G06K 13/08 439/157 |
| 2014/0113495 | A1* | 4/2014 | Lim ...................... H01R 27/00 439/630 |
| 2014/0148036 | A1 | 5/2014 | Tan et al. |

FOREIGN PATENT DOCUMENTS

| CN | 203242821 U | 10/2013 |
| CN | 203326222 U | 12/2013 |

* cited by examiner

*Primary Examiner* — Briggitte R Hammond
(74) *Attorney, Agent, or Firm* — James A. O'Malley; Stephen L. Sheldon (57) ABSTRACT

An electrical connector which comprises a tray, a terminal module, an upper cover and a detecting switch. The tray comprises a pushing block. The upper cover cooperates with the terminal module to define an insertion space extending along a front-rear direction for insertion of the tray. The detecting switch comprises a detecting terminal. The detecting terminal is provided at one side of the insertion space. The detecting terminal comprises a tail, an elastic arm extending forwards and an insulative pushed block provided at a front end of the elastic arm. The elastic arm comprises a contact. The pushing block of the tray pushes the insulative pushed block of the detecting terminal so as to make the elastic arm of the detecting terminal and the contact displaced elastically in an up-down direction.

9 Claims, 8 Drawing Sheets

ELECTRICAL CONNECTOR

RELATED APPLICATIONS

This application claims priority to Chinese Application No. 201410364710.2, filed Jul. 29, 2014, which is incorporated herein by reference in its entirety.

TECHNICAL FIELD

The present disclosure relates to an electrical connector.

BACKGROUND ART

An electrical connector may be provided with a switch to detect whether an electronic card or a tray is inserted or not.

Chinese patent application CN201320273241.4 (Taiwanese patent issued as TWM469657) discloses an electrical connector which comprises a switch unit. The switch unit comprises an insulative housing, a detecting terminal and a conductive piece. The detecting terminal is fixed on the insulative housing and has an elastic arm. An end of the elastic arm extends into a card insertion space of the electrical connector. An insulative sheath surrounds the end of the elastic arm.

The detecting terminal and the conductive piece are positioned at a side of the card insertion space, in addition that a space at the side of the insertion space is occupied, the detecting terminal extends toward the card insertion space transversely so as to make the end of the elastic arm positioned in the card insertion space, and in turn allow the tray to push the detecting terminal to move toward the side of the card insertion space. The detecting terminal moves transversely to contact or be out of contact with the conductive piece, so the space at the side of the card insertion space occupied by the detecting terminal relative to the whole electrical connector will be larger. Moreover, because the detecting terminal moves transversely, the conductive piece has to be formed by cut a shield shell and bend the cut portion of the shield shell inwards so as to cooperate with the detecting terminal, therefore it is complex to manufacture the conductive piece. In addition, the detecting terminal directly contacts the tray at the side of the card insertion space, the detecting terminal will exert a force on the tray, which may result in the deformation of the empty tray or make the tray move in a direction opposite to the side of the card insertion space.

SUMMARY OF THE INVENTION

The present disclosure provides an electrical connector which comprises a tray, a terminal module, an upper cover and a detecting switch. The tray comprises a pushing block. The upper cover cooperates with the terminal module to define an insertion space extending along a front-rear direction for insertion of the tray and an opening positioned at a front end of the insertion space for insertion of the tray. The detecting switch comprises a detecting terminal. The detecting terminal is provided at one side of the insertion space along a left-right direction. The detecting terminal does not extend into the insertion space. The detecting terminal comprises a tail, an elastic arm extending forwards and an insulative pushed block provided at a front end of the elastic arm. The elastic arm comprises a contact. The pushing block of the tray pushes the insulative pushed block of the detecting terminal so as to make the elastic arm of the detecting terminal and the contact displaced elastically in an up-down direction, and in turn make the detection status of the detecting switch changed.

In some embodiments, the detecting switch comprises a conductive member, when the pushing block of the tray pushes the insulative pushed block of the detecting terminal away, the contact of the detecting terminal contacts the conductive member or is out of contact with the conductive member. In some embodiments, the upper cover is a metal upper cover, a bottom region of the metal upper cover acts as the conductive member. In some embodiments, the insulative pushed block of the detecting terminal comprises a pushed surface oblique forwards and upwards, the pushing block of the tray comprises a pushing surface oblique backwards and downwards, when the pushing block pushes the insulative pushed block, the pushing surface contacts the pushed surface.

In some embodiments, the detecting switch is a normal close switch, the contact of the detecting terminal contacts the conductive member when the tray is not inserted, when the pushing block of the tray pushes the insulative pushed block of the detecting terminal away, the contact of the detecting terminal is out of contact with the conductive member.

In some embodiments, the detecting terminal comprises a fixed portion positioned between the tail and the elastic arm, and comprises a fixed block provided on the fixed portion. In some embodiments, the fixed block has an insertion hole, the upper cover comprises an inserting piece, and the inserting piece is inserted into the insertion hole.

In some embodiments, the fixed portion of the detecting terminal has an aperture, the aperture corresponds to the insertion hole of fixed block, the inserting piece of the upper cover comprises an interference block, the interference block and the fixed block are engaged as interference fit.

In some embodiments, the tray comprises a frame portion, the frame portion comprises a front frame bar, the front frame bar comprises a side extending portion, the side extending portion extends in front of the detecting terminal, the pushing block is provided on a rear surface of the side extending portion.

DETAILED DESCRIPTION OF THE PREFERRED EMBODIMENTS

The effects of the present disclosure are as follows: the detecting terminal of the detecting switch of the electrical connector extends forwards at a side of the insertion space, and the detecting terminal is displaced elastically in the thickness direction of the electrical connector (the up-down direction) to change the detection status. The extension and elastic displacement manner of the detecting terminal allow the detecting terminal to occupy less mounting space.

Figure 1:
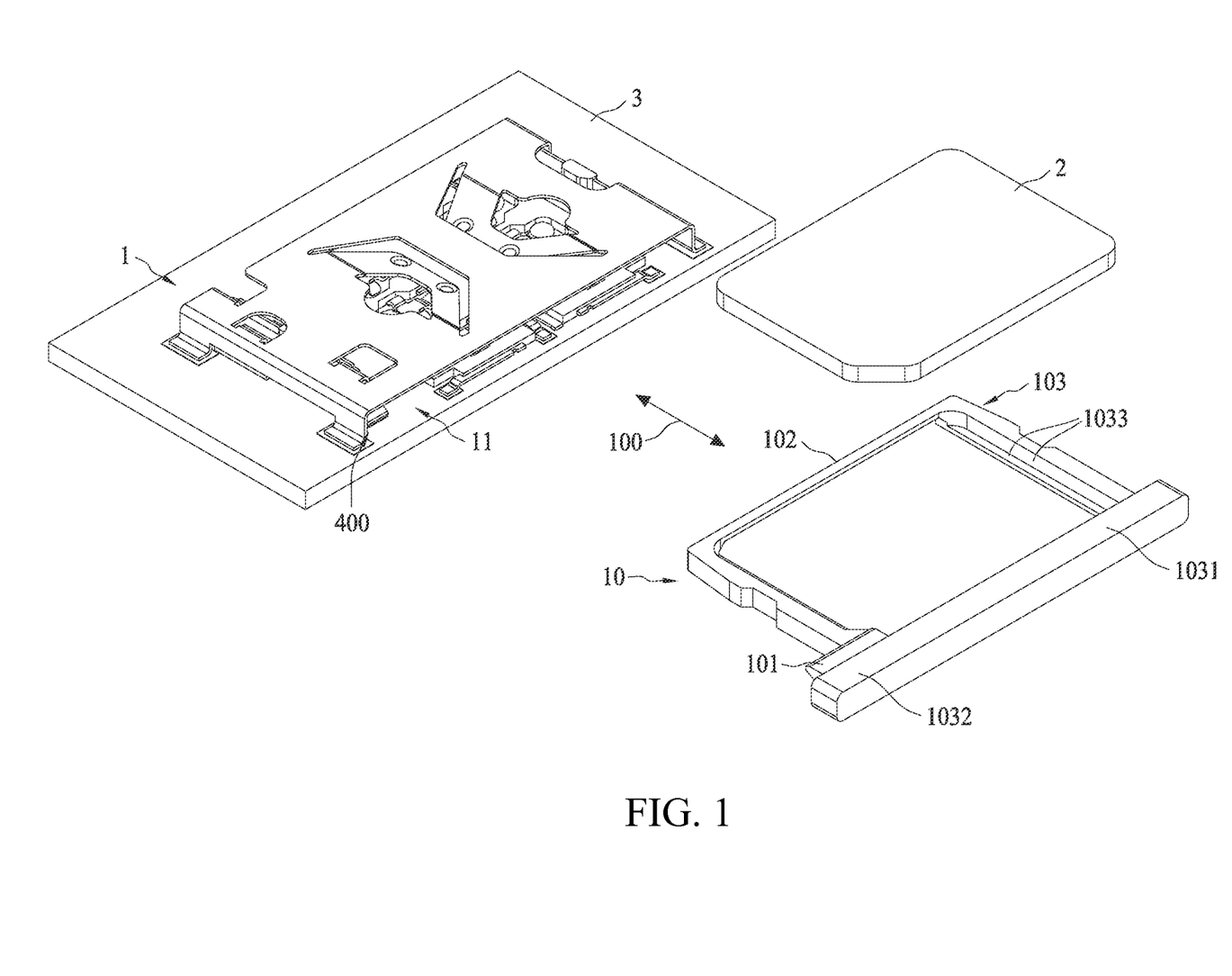
FIG. 1 is a schematic view of an embodiment of the present disclosure illustrating an electrical connector, a tray of the electrical connector, an electronic card and a circuit board.
Figure 2:
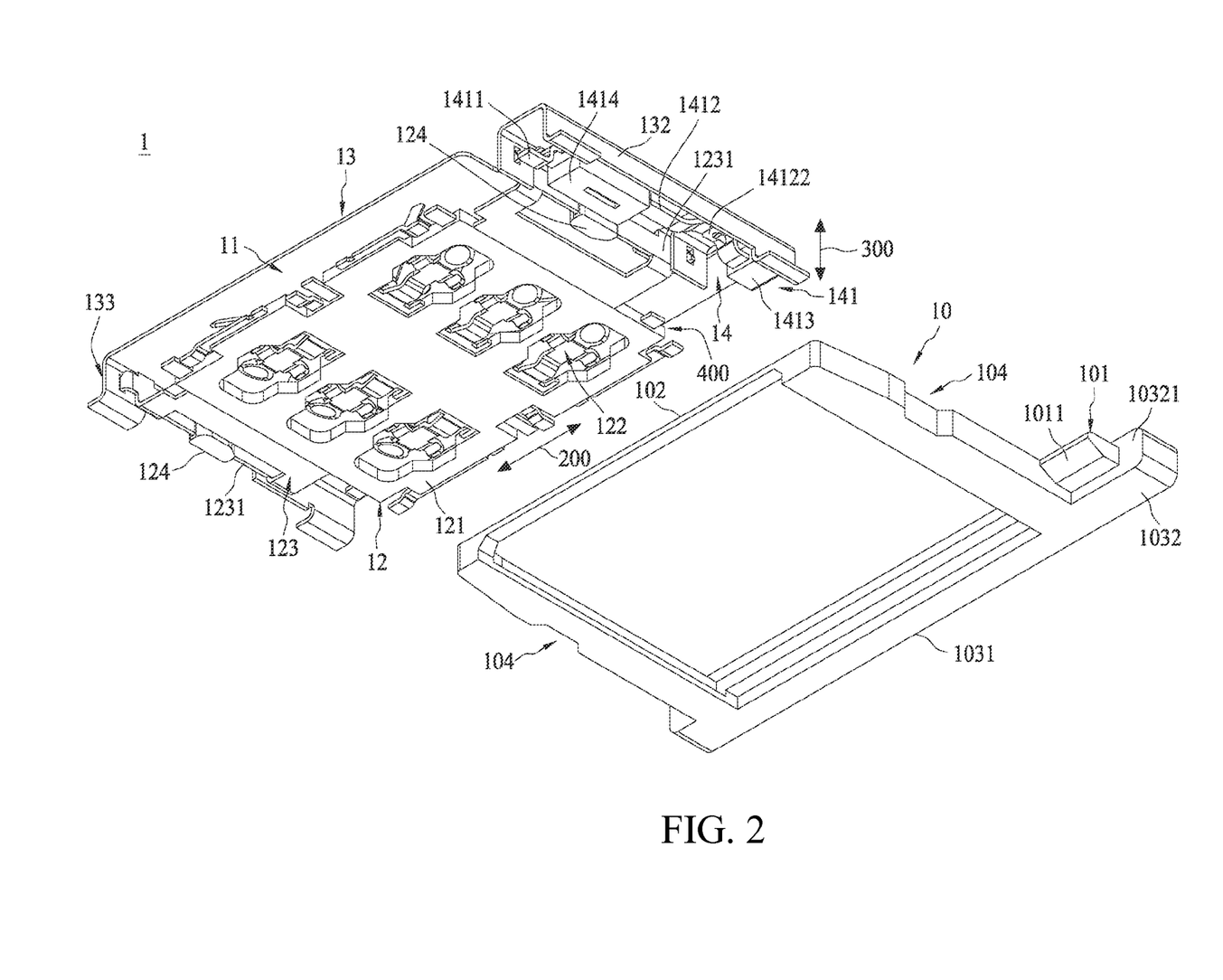
FIG. 2 is a schematic view of an embodiment of the present disclosure illustrating an electrical connector and a tray thereof.

Referring to FIG. 1 and FIG. 2, an electrical connector 1 may be provided on a circuit board 3. The electrical connector 1 comprises a tray 10. The tray 10 may carry an electronic card 2. The electrical connector 1 defines an insertion space 11. The tray 10 may be inserted into the insertion space 11, thereby making the electronic card 2 electrically connected to the circuit board 3 via the electrical connector 1.

Figure 3:
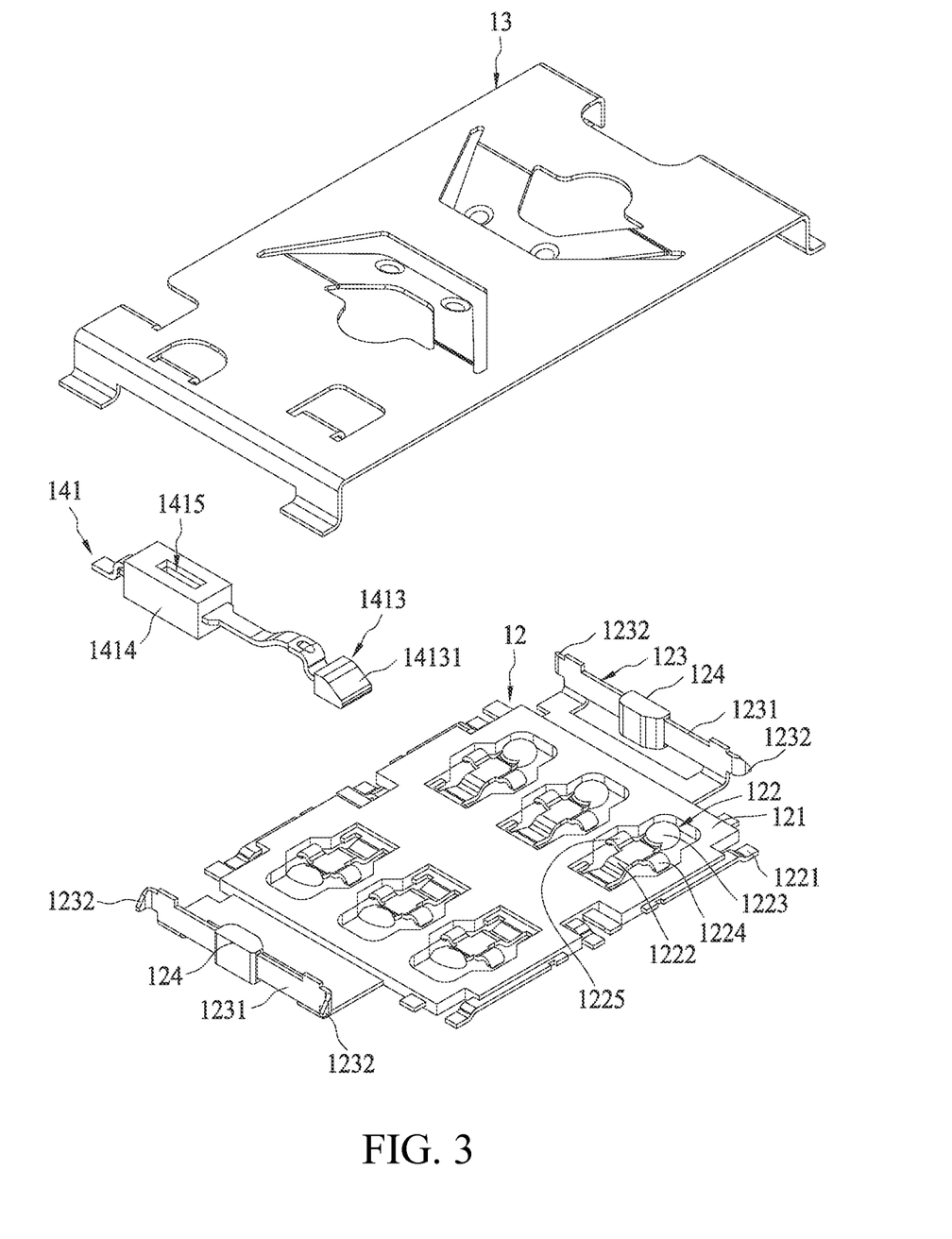
FIG. 3 is an exploded view of an electrical connector of an embodiment of the present disclosure.

Referring to FIG. 1 to FIG. 3, the electrical connector 1 comprises a terminal module 12, an upper cover 13 and a detecting switch 14. The upper cover 13 cooperates with the terminal module 12 to define the insertion space 11 for insertion of the tray 10. The insertion space 11 may extend along a front-rear direction 100 (or an insertion-removing direction of the tray 10), the insertion space 11 has an opening 400 for insertion of the tray 10 at a front end thereof.

The detecting switch 14 is used to detect whether the tray 10 is inserted in the electrical connector 1 or not. The detecting switch 14 comprises a detecting terminal 141. The detecting terminal 141 is provided at one side of the insertion space 11 in a left-right direction 200. In some embodiments, the detecting terminal 141 is positioned outside the insertion space 11, or the detecting terminal 141 does not extend into the insertion space 11.

Figure 4:
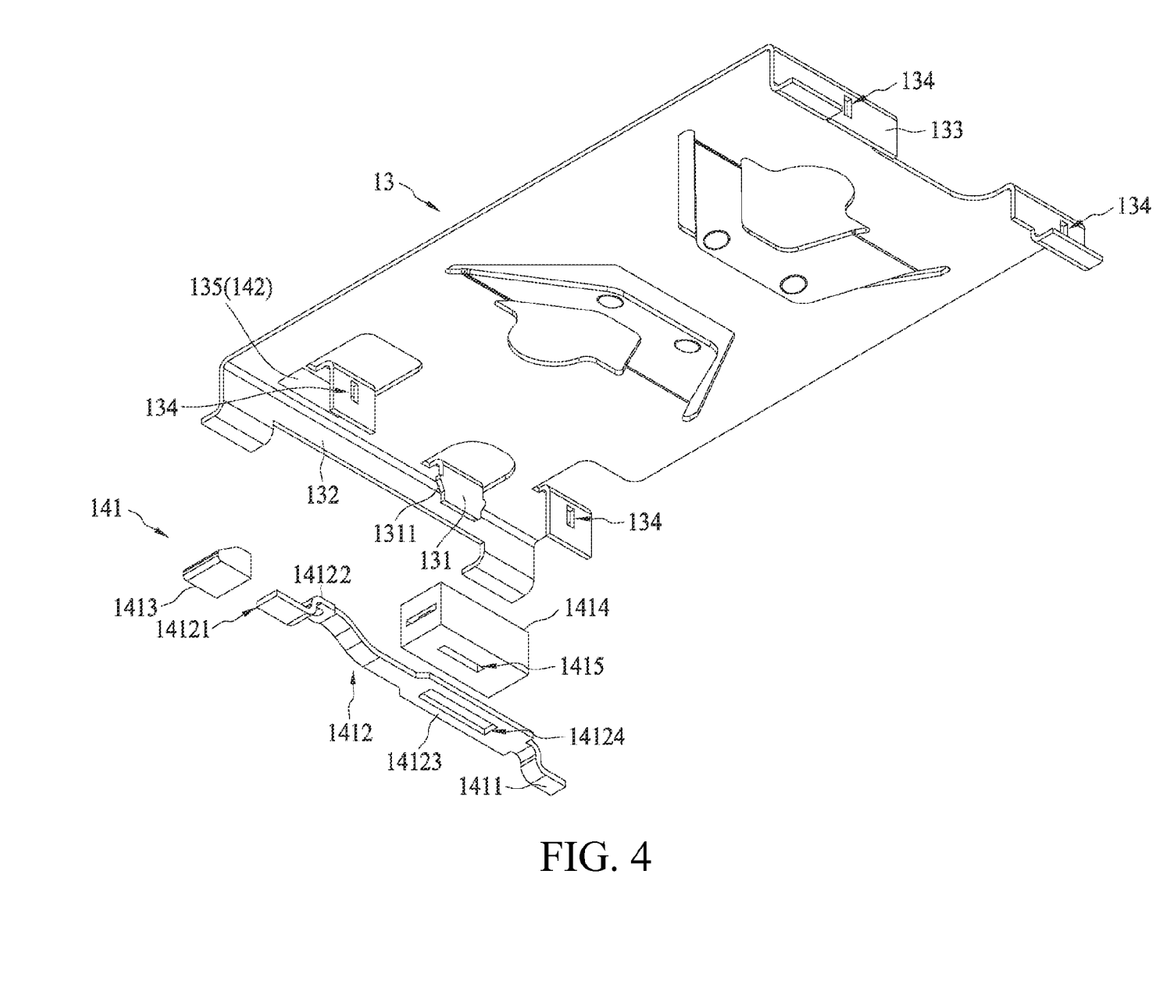
FIG. 4 is a schematic view of an embodiment of the present disclosure illustrating an upper cover and an exploded detecting terminal of an electrical connector.
Figure 5:
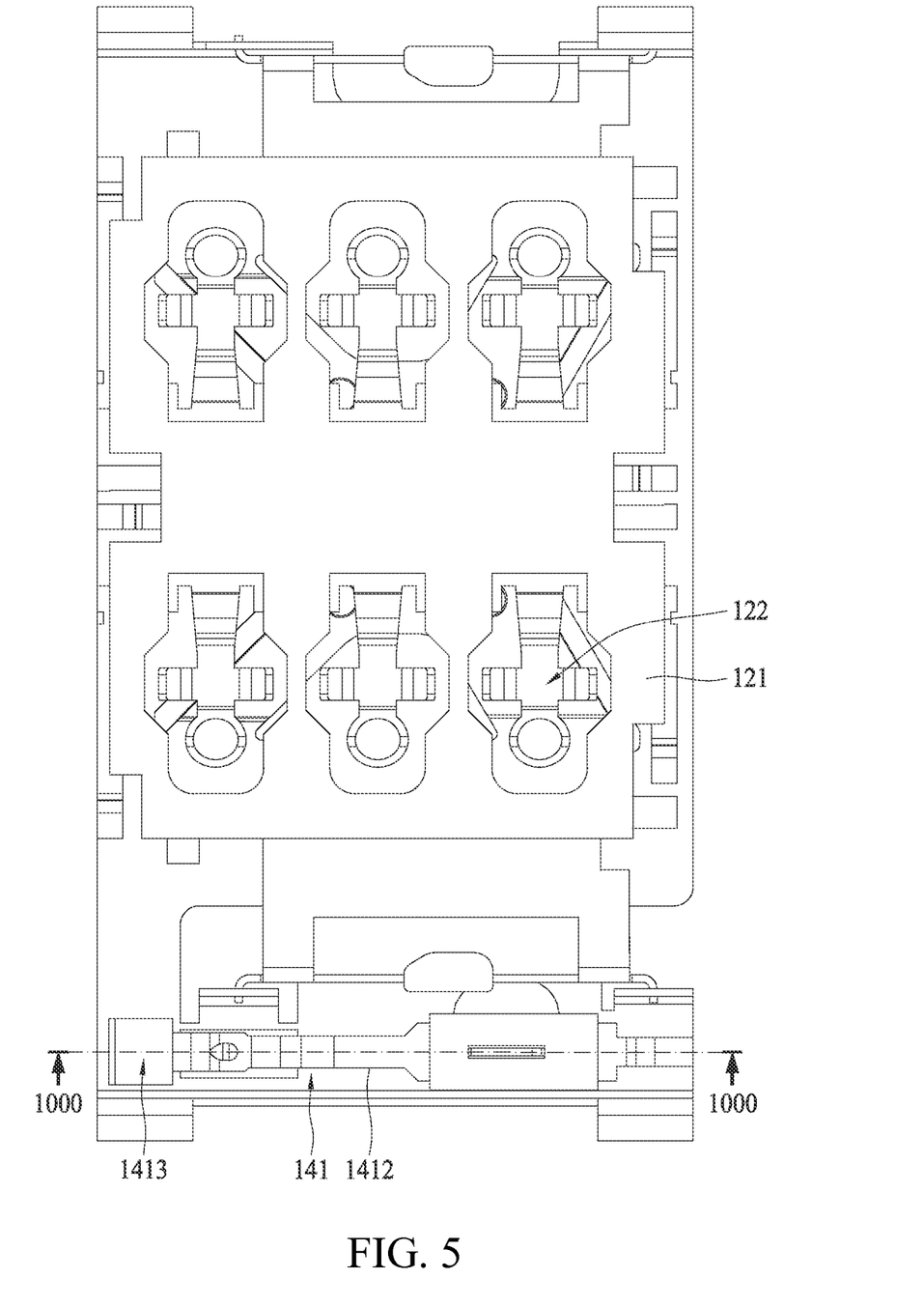
FIG. 5 is a schematic view of an electrical connector of an embodiment of the present disclosure.

Referring to FIG. 1, FIG. 2 and FIG. 4, the detecting terminal 141 comprises a tail 1411 as a soldering portion, an elastic arm 1412 and an insulative pushed block 1413. The tail 1411 may be soldered on the circuit board 3 or the detecting terminal 141 or the tail 1411 may be connected to a conductive path on the circuit board 3 with other configurations. The elastic arm 1412 may extend forwards. The elastic arm 1412 may be elastically displaced along an up-down direction (i.e. upwards or downwards) 300 or a thickness direction of the electrical connector 1. The elastic arm 1412 may have a front end 14121. The insulative pushed block 1413 may be provided on the front end 14121 of the elastic arm 1412. The elastic arm 1412 may comprise a contact 14122. A portion between the contact 14122 and the tail 1411 is used to establish an electrical connecting path. When a force is exerted on the insulative pushed block 1413 or a force is no longer exerted on the insulative pushed block 1413, the elastic arm 1412 and the contact 14122 may be elastically displaced along the up-down direction 300, thereby making the detection status of the detecting switch 14 changed correspondingly.

Referring to FIG. 2, the tray 10 comprises a pushing block 101. The pushing block 101 is used to push the insulative pushed block 1413 of the detecting terminal 141, thereby making the elastic arm 1412 of the detecting terminal 141 and the contact 14122 elastically displaced along the up-down direction 300, and in turn making the detection status of the detecting switch 14 changed.

Figure 7:
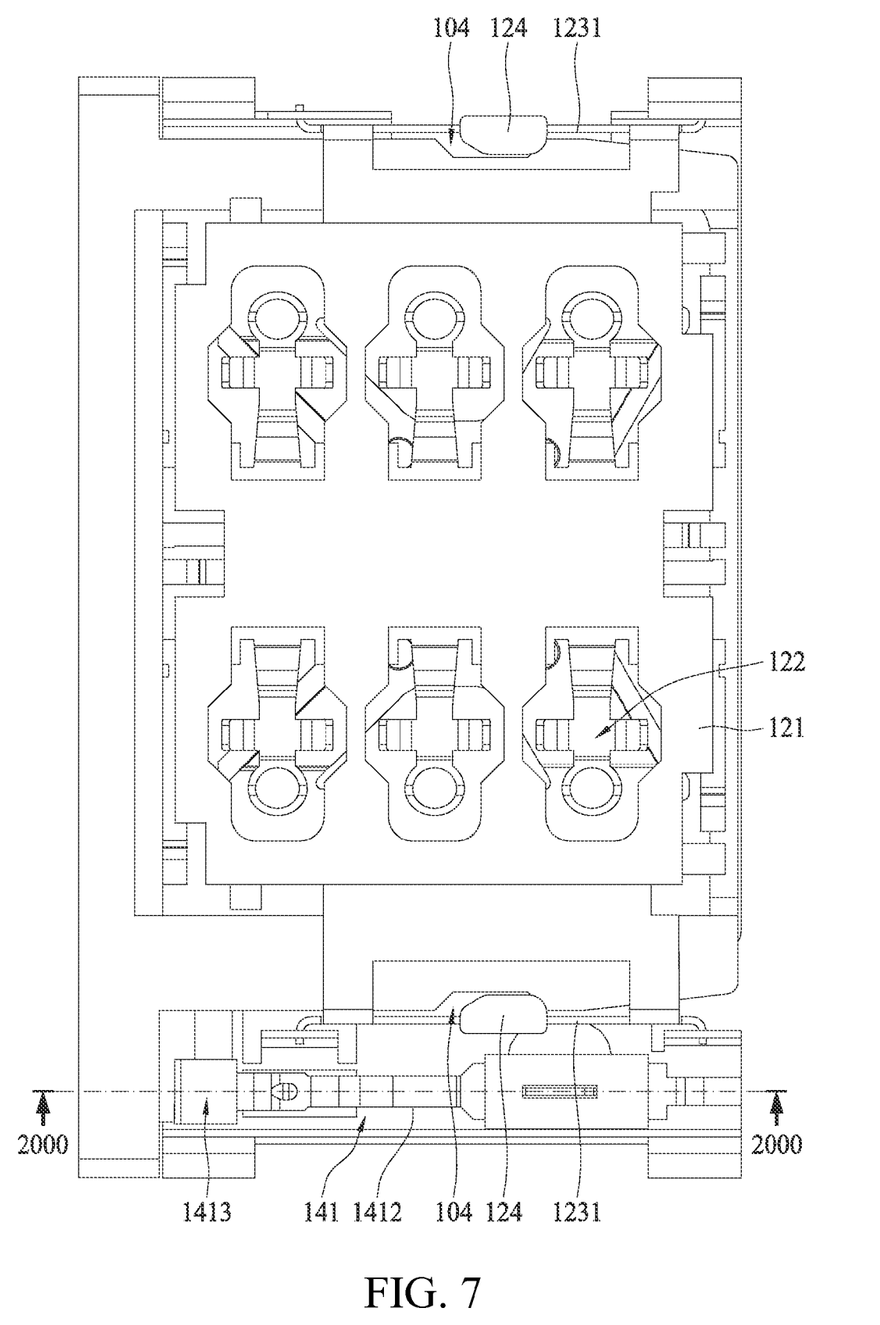
FIG. 7 is a schematic view of an electrical connector of an embodiment of the present disclosure.
Figure 8:
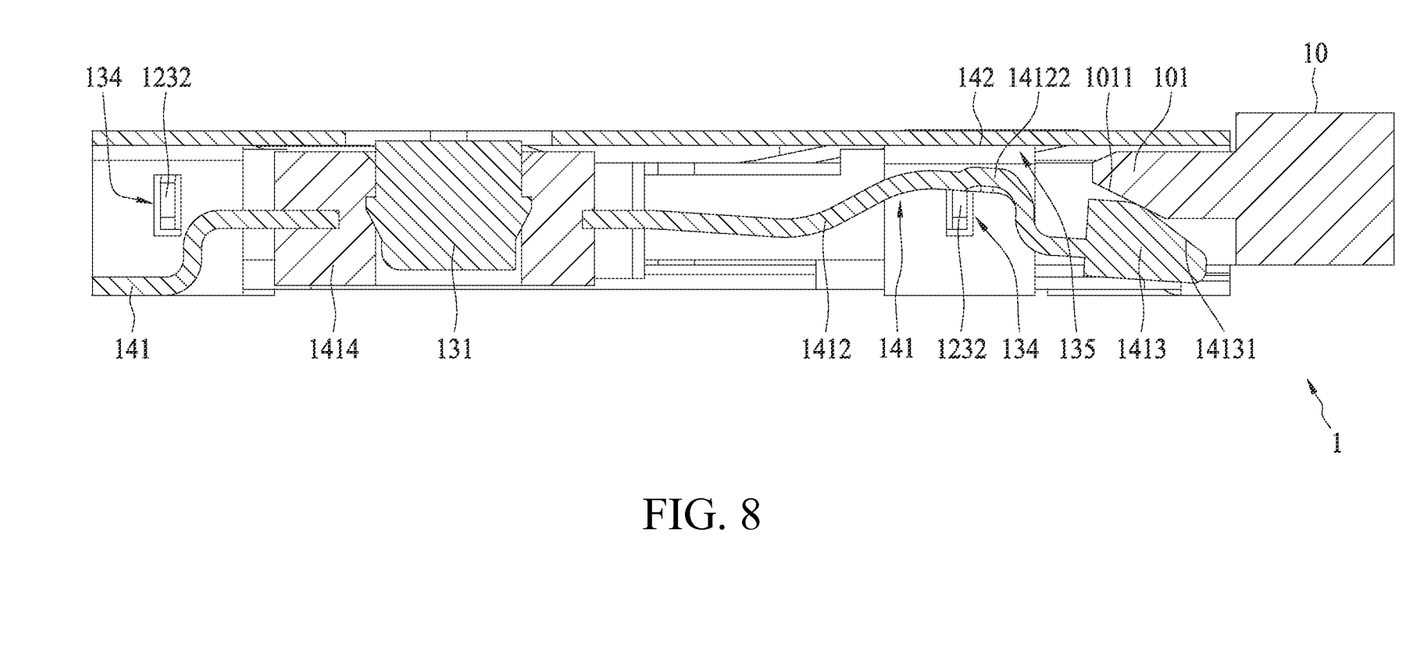
FIG. 8 is a cross sectional view taken along a line 2000-2000 in FIG. 7.

Referring to FIG. 2, FIG. 3, FIG. 5 and FIG. 6, in some embodiments the insulative pushed block 1413 of the detecting terminal 141 comprises a pushed surface 14131 oblique forwards and upwards. When a rear edge 102 of the tray 10 is inserted into the insertion space 11, the pushing block 101 faces the pushed surface 14131. As the tray 10 is inserted into the insertion space 11 gradually, the pushing block 101 will move along the pushed surface 14131, and push the insulative pushed block 1413, thereby making the elastic arm 1412 and the contact 14122 elastically displaced and in turn making the detection status of the detecting switch 14 changed. Referring to FIG. 2, in some embodiments, the pushing block 101 of the tray 10 comprises a pushing surface 1011 oblique backwards and downwards. Referring to FIG. 7 and FIG. 8, when the pushing block 101 pushes the insulative pushed block 1413, the pushing surface 1011 will contact the pushed surface 14131 until the tray 10 has been inserted into the insertion space 11 completely.

Referring to FIG. 1 and FIG. 2, in some embodiments, the tray 10 comprises a frame portion 103. The frame portion 103 defines a space for receiving the electronic card 2. In some embodiments, the frame portion 103 may be a closed frame. In some embodiments, the frame portion 103 may be a non-closed frame. In some embodiments, the frame portion 103 comprises a front frame bar 1031. The tray 10 may be inserted completely by pressing a front surface of the front frame bar 1031. The front frame bar 1031 comprises a side extending portion 1032. When the tray 10 is inserted into the insertion space 11, the side extending portion 1032 extends in front of the detecting terminal 141. The pushing block 101 of the tray 10 may be provided on a rear surface 10321 of the side extending portion 1032. In some embodiments, the pushing block 101 may be provided at a portion except the front frame bar 1031 of the tray 10 in position corresponding to the detecting terminal 141. In some embodiments, the tray 10 may be non-metal. In some embodiments, the tray 10 may be metal, furthermore, an inner edge portion 1033 of the metal frame portion 103 for supporting and contacting the electronic card 2 may be covered with an insulative material layer so as to avoid conductive pads provided on the electronic card 2 contacting the metal frame portion 103.

Figure 6:
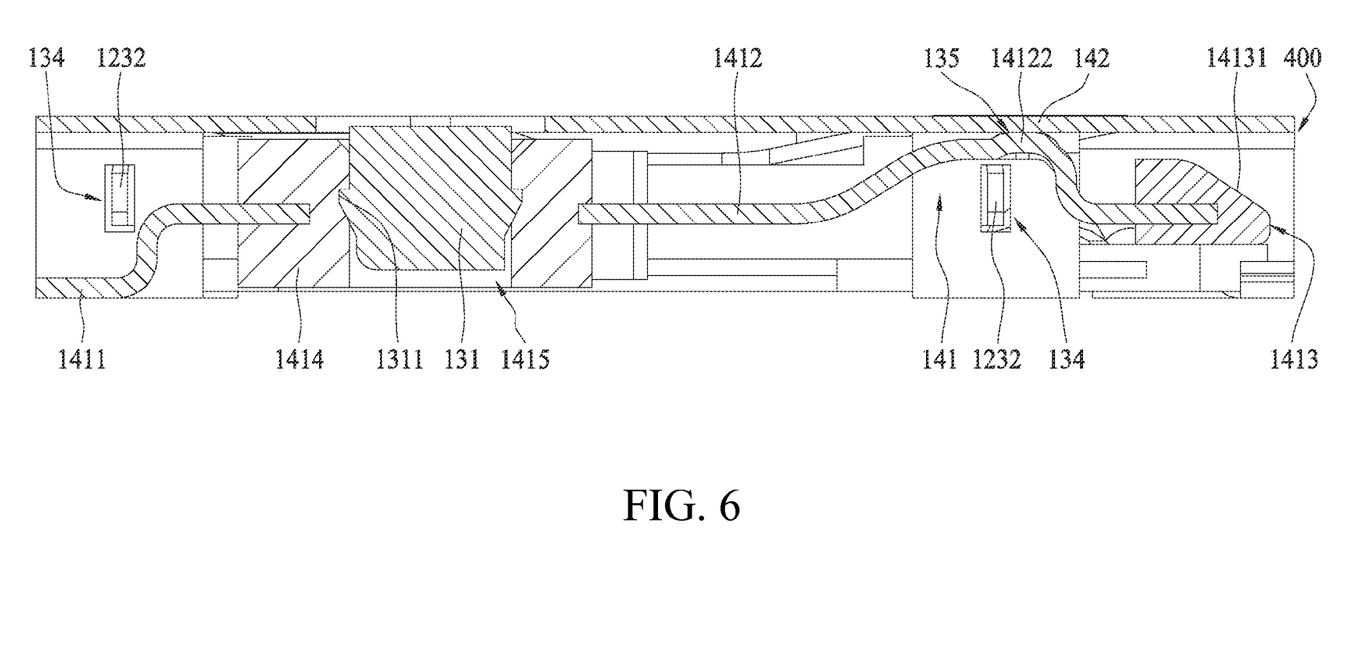
FIG. 6 is a cross sectional view taken along a line 1000-1000 in FIG. 5.

Referring to FIG. 4, FIG. 6 and FIG. 8, the detecting switch 14 comprises a conductive member 142. When the detection status that the contact 14122 of the detecting terminal 141 is out of contact with or contacts the conductive member 142 is changed, a circuit may be turned off or turned on. When the pushing block 101 of the tray 10 pushes the insulative pushed block 1413 of the detecting terminal 141 away, the contact 14122 of the detecting terminal 141 may contact the conductive member 142 or be out of contact with the conductive member 142. In some embodiments, as shown in FIG. 6, the detecting switch 14 is a normal close switch, the contact 14122 of the detecting terminal 141 contacts the conductive member 142, as shown in FIG. 8, when the pushing block 101 of the tray 10 pushes the insulative pushed block 1413 of the detecting terminal 141 away, the contact 14122 of the detecting terminal 141 is out of contact with the conductive member 142. In some embodiments, the detecting switch 14 is a normal open switch, when the detecting switch 14 is a normal open switch, as the pushing block 101 doe not contact the insulative pushed block 1413, the detecting terminal 141 and the conductive member 142 are separated from each other, but when the pushing block 101 pushes the insulative pushed block 1413, the contact 14122 of the detecting terminal 141 moves toward the conductive member 142 until the contact 14122 of the detecting terminal 141 contacts the conductive member 142. In some embodiments, if the conductive member 142 is positioned above the contact 14122 of the detecting terminal 141, the pushing block 101 pushes the insulative pushed block 1413 upwards, thereby making the contact 14122 contact the conductive member 142; or the pushing block 101 pushes the insulative pushed block 1413 downwards, thereby making the contact 14122 out of contact with the conductive member 142. In some embodiments, if the conductive member 142 is positioned below the contact 14122 of the detecting terminal 141, the pushing block 101 pushes the insulative pushed block 1413 upwards, thereby making the contact 14122 out of contact with the conductive member 142; or the pushing block 101 pushes the insulative pushed block 1413 downwards, thereby making the contact 14122 contact the conductive member 142.

In some embodiments, the upper cover 13 is a metal upper cover, as shown in FIG. 4, a bottom region 135 of the metal upper cover acts as the conductive member 142 and is a part of the metal upper cover. In some embodiments, the conductive member 142 is a member separated from the metal upper cover. In some embodiments, the conductive member 142 is provided on the terminal module 12.

Referring to FIG. 3 and FIG. 4, the detecting terminal 141 may be fixed on any proper position of the electrical connector 1. In some embodiments, the detecting terminal 141 comprises a fixed block 1414 that is insulative. The detecting terminal 141 is fixed on any proper position of the electrical connector 1 via the fixed block 1414. In some embodiments, the detecting terminal 141 comprises a fixed portion 14123. The fixed block 1414 is provided on the fixed portion 14123. In some embodiments, at least a part of the fixed portion 14123 is embedded in the fixed block 1414, but the present disclosure is not limited to this.

In some embodiments, the fixed block 1414 has an insertion hole 1415, and the electrical connector 1 comprises an inserting piece 131. The inserting piece 131 is inserted into the insertion hole 1415, thereby making the detecting terminal 141 fixed. In some embodiments, the upper cover 13 comprises an inserting piece 131, but the present disclosure is not limited to this.

Referring to FIG. 4, in some embodiments, the fixed portion 14123 of the detecting terminal 141 has an aperture 14124. The aperture 14124 corresponds to the corresponding insertion hole 1415 of the fixed block 1414. The aperture 14124 may allow the inserting piece 131 to pass through. In some embodiments, the fixed portion 14123 of the detecting terminal 141 may not have an aperture, but may extend in a manner of keeping away from the inserting piece 131.

Referring to FIG. 4 and FIG. 6, in some embodiments, the inserting piece 131 of the upper cover 13 comprises at least an interference block 1311. The interference block 1311 and the insertion hole 1415 of the fixed block 1414 are engaged as interference fit. When the inserting piece 131 is inserted into the insertion hole 1415 of the fixed block 1414, the interference block 1311 may be anchored in the insertion hole 1415 of the fixed block 1414 so as to make the detecting terminal 141 fixed on the upper cover 13.

Referring to FIG. 2 and FIG. 3, the terminal module 12 comprises an insulative housing 121, a plurality of conductive terminals 122 and a metal frame 123. The plurality of conductive terminals 122 and the metal frame 123 are fixed on the insulative housing 121. The metal frame 123 comprises two elastic beams 1231. The two elastic beams 1231 are positioned at two opposite sides of the terminal module 12 so as to define the insertion space 11, and the detecting terminal 141 is positioned outside one elastic beam 1231 and adjacent to the one elastic beam 1231, and is spaced apart from the one elastic beam 1231.

Referring to FIG. 2, FIG. 3 and FIG. 7, in some embodiments, the terminal module 12 comprises two latch blocks 124. The latch block 124 is provided on the corresponding elastic beam 1231. The tray 10 is provided with corresponding latch recesses 104, when the tray 10 is inserted into the insertion space 11 completely, the latch block 124 latches on to the corresponding latch recess 104 so as to make the tray 10 held in the insertion space 11.

Referring to FIG. 3 and FIG. 4, the metal frame 123 comprises a latch hook 1232, the upper cover 13 is provided with a latch hole 134 correspondingly, the latch hook 1232 and the corresponding latch hole 134 are engaged as clearance fit. That the latch hook 1232 latches on to the corresponding latch hole 134 makes the upper cover 13 fixed on the terminal module 12, which provides the movable margin for each of the upper cover 13 and the terminal module 12 to increases the coplanarity of the surface soldering before the upper cover 13 and the terminal module 12 are soldered to the circuit board 3.

Referring to FIG. 2 and FIG. 4, in some embodiments, the upper cover 13 comprises two outer side walls 132, 133. The terminal module 12 is positioned between the two outer side walls 132, 133, and the detecting terminal 141 is wholly positioned between the outer side wall 132 and one elastic beam 1231 and separated from the outer side wall 132 and the elastic beam 1231.

Referring to FIG. 2 and FIG. 3, in some embodiments, the conductive terminal 122 comprises a tail 1221, an elastic arm 1222 and a contact 1223. The tail 1221 may be soldered to the circuit board 3. The contact 1223 may be positioned at an end of the elastic arm 1222. In some embodiments, the conductive terminal 122 may further comprise a front guiding member 1224. The front guiding member 1224 is a part of the conductive terminal 122 close to the opening 400 of the electrical connector 1. When the tray 10 is inserted into the insertion space 11, the front guiding member 1224 will be pressed downwards first, thereby lowering a height of the contact 1223 and decreasing the impact force and the lateral shearing force exerted on the conductive terminal 122 when the tray 10 is inserted, so as to attain the purpose of protecting the terminal. In some embodiments, the conductive terminal 122 comprises a rear guiding member 1225. The rear guiding member 1225 is a part of the conductive terminal 122 relative far from the opening 400 of the electrical connector 1. The rear guiding member 1225 may prevent the empty tray 10, which does not carry the electronic card 2, from hooking the conductive terminal 122.

In some embodiments, the detecting terminal of the detecting switch is mounted at a side of the insertion space for insertion of the tray. The detecting terminal extends forwards, and an insulative pushed block is provided at an end of the detecting terminal. The tray is provided with a pushing block corresponding to the insulative pushed block of the detecting terminal. The pushing block pushes the insulative pushed block so as to make the detecting terminal displaced elastically along a thickness direction (an up-down direction) of the electrical connector, and in turn make the detection status changed. The detecting terminal has an advantage that a less mounting space is required. In some embodiments, the upper cover acts as the conductive member to cooperate with the detecting terminal of the detecting switch, so that the conductive member is not required to manufacture separately. In some embodiments, the detecting terminal of the electrical connector does not extend into the insertion space for insertion of the tray. In some embodiments, the detecting terminal of the electrical connector does not contact the tray inserted into the insertion space, so the tray is not subjected to a force from the detecting terminal, and the detecting terminal is not easy to deform, the tray will not generate movement in a direction opposite to the side of the insertion space too.

As can be appreciated, therefore, embodiments can include a number of different features. Certain embodiments include the following.

In some embodiments, the insulative pushed block of the detecting terminal comprises a pushed surface oblique forwards and upwards, the pushing block of the tray comprises a pushing surface oblique backwards and downwards, when the pushing block pushes the insulative pushed block, the pushing surface contacts the pushed surface. In some embodiments, the detecting switch comprises a conductive member, when the pushing block of the tray pushes the insulative pushed block of the detecting terminal away, the contact of the detecting terminal contacts the conductive member or is out of contact with the conductive member.

In some embodiments, the upper cover is a metal upper cover, a bottom region of the metal upper cover acts as the conductive member. In some embodiments, the detecting terminal comprises a fixed portion positioned between the tail and the elastic arm, and comprises an fixed block provided on the fixed portion.

In some embodiments, the fixed block has an insertion hole, the upper cover comprises an inserting piece, and the inserting piece is inserted into the insertion hole. In some embodiments, the fixed portion of the detecting terminal has an aperture, the aperture corresponds to the insertion hole of fixed block, the inserting piece of the upper cover comprises an interference block, the interference block and the fixed block are engaged as interference fit.

In some embodiments, the tray comprises a frame portion, the frame portion comprises a front frame bar, the front frame bar comprises a side extending portion, the side extending portion extends in front of the detecting terminal, the pushing block is provided on a rear surface of the side extending portion. In some embodiments, the terminal module comprises two elastic beams which define the insertion space, the detecting terminal is positioned outside one two elastic beams and adjacent to the one elastic beam.

In some embodiments, the terminal module comprises two elastic beams which define the insertion space, the upper cover comprises two outer side walls, the detecting terminal is positioned between one of the two elastic beams and corresponding one of the two outer side walls.

The technical content and technical features of the present disclosure are disclosed as above, but person skilled in the art still may make various substitutions and modifications without departing from the spirit of the present disclosure based on the teaching and disclosure of the present disclosure. Therefore the protection scope of the present disclosure should not be limited to the contents disclosed by the embodiments, but should include various substitutions and modifications without departing the present disclosure, and is covered by the appended Claims of the present disclosure.

What is claimed is:

1. An electrical connector, comprising:
   a tray comprising a first pushing block;
   a terminal module;
   an upper cover cooperating with the terminal module to define an insertion space extending along a front-rear direction for insertion of the tray and an opening positioned at a front end of the insertion space for insertion of the tray; and
   a detecting switch that includes a detecting terminal, the detecting terminal having a tail, an elastic arm extending forwards and a second pushing block provided at a front end of the elastic arm, the detecting terminal being provided at one side of the insertion space along a left-right direction, the detecting terminal not extending into the insertion space, and the elastic arm having a contact, wherein the first pushing block is configured to push the second pushing block of the detecting terminal so as to make the elastic arm of the detecting terminal and the contact displaced elastically in an up-down direction which in turn causes the detection status of the detecting switch to change.

2. The electrical connector according to claim 1, wherein the detecting switch comprises a conductive member and the contact of the detecting terminal is configured to make or break a connection with the conductive member when the first pushing block pushes the second pushing block.

3. The electrical connector according to claim 2, wherein the upper cover is a metal upper cover, a bottom region of the metal upper cover acts as the conductive member.

4. The electrical connector according to claim 3, wherein the first pushing block has a first pushing surface that is oblique backwards and downwards and the second pushing block has a second pushing surface that is oblique forwards and upwards, when the first pushing block pushes the second pushing block, the first pushing surface contacts the second pushing surface.

5. The electrical connector according to claim 4, wherein the detecting switch is is configured so that the contact of the detecting terminal is electrically connected to the conductive member when the tray is not inserted and, in operation, when the first pushing block pushes the second pushing block the contact of the detecting terminal is electrically isolated from the conductive member.

6. The electrical connector according to claim 1, wherein the detecting terminal comprises a fixed portion positioned between the tail and the elastic arm and a fixed block is provided on the fixed portion.

7. The electrical connector according to claim 6, wherein the fixed block has an insertion hole, the upper cover comprises an inserting piece, and the inserting piece is inserted into the insertion hole.

8. The electrical connector according to claim 7, wherein the fixed portion of the detecting terminal has an aperture, the aperture corresponds to the insertion hole of the fixed block, the inserting piece of the upper cover comprises an interference block and the interference block and the fixed block are engaged as interference fit.

9. The electrical connector according to claim 1, wherein the tray comprises a frame portion, the frame portion comprises a front frame bar, the front frame bar comprises a side extending portion, the side extending portion extends in front of the detecting terminal, the pushing block is provided on a rear surface of the side extending portion.

* * * * *